US012810006B2

(12) United States Patent
Glenski et al.

(10) Patent No.: US 12,810,006 B2
(45) Date of Patent: Nov. 24, 2026

(54) DYNAMIC DISTRIBUTED DATA ACCESS CONTROL

(71) Applicant: BMC Software, Inc., Houston, TX (US)

(72) Inventors: Jennifer Ann Glenski, Denver, CO (US); Eric Michael Anderson, Friendswood, TX (US); Devasia Antony Muthalakuzhy Thomas, San Jose, CA (US); Theo Victor Perez Nordahl, Lomma (SE)

(73) Assignee: BMC Software, Inc., Houston, TX (US)

( * ) Notice: Subject to any disclaimer, the term of this patent is extended or adjusted under 35 U.S.C. 154(b) by 0 days.

(21) Appl. No.: 18/588,845

(22) Filed: Feb. 27, 2024

(65) Prior Publication Data

US 2025/0272420 A1 Aug. 28, 2025

(51) Int. Cl.
*G06F 21/62* (2013.01)

(52) U.S. Cl.
CPC ................................ *G06F 21/6218* (2013.01)

(58) Field of Classification Search
CPC ......... G06F 21/6227; G06F 2221/2149; G06F 21/6218; G06F 21/6209; G06F 21/31; G06F 21/62; H04L 63/105
See application file for complete search history.

(56) References Cited

U.S. PATENT DOCUMENTS

| | | | | |
|---|---|---|---|---|
| 9,455,996 | B2 * | 9/2016 | Chao | G06F 16/9014 |
| 9,705,730 | B1 * | 7/2017 | Petri | G06F 11/1453 |
| 9,960,920 | B2 * | 5/2018 | Cuende | H04L 9/3236 |
| 10,303,363 | B2 * | 5/2019 | Pogosyan | G06F 3/0608 |
| 11,093,638 | B2 * | 8/2021 | Barouch | H04L 63/12 |
| 11,139,959 | B2 * | 10/2021 | Dickens, III | G06F 3/0604 |
| 11,520,778 | B2 * | 12/2022 | Winarski | G06F 16/9024 |
| 11,785,079 | B2 * | 10/2023 | Basu | H04L 63/10 |
| 11,934,674 | B2 * | 3/2024 | Lin | G06F 3/0617 |
| 12,003,660 | B2 * | 6/2024 | Bernardi | H04L 67/104 |
| 12,218,795 | B2 * | 2/2025 | Smith | H04L 61/4505 |
| 12,306,981 | B2 * | 5/2025 | Adkins | G06F 21/121 |

* cited by examiner

*Primary Examiner* — Hosuk Song
(74) *Attorney, Agent, or Firm* — Brake Hughes Bellermann LLP

(57) ABSTRACT

Dynamic data access control may be provided by granting an access request for accessed data that is governed by an access policy. A hash tree may be generated for the accessed data. The hash tree may be stored in conjunction with the access policy, and the access policy may be related to uploaded data, based on the hash tree.

17 Claims, 8 Drawing Sheets

DYNAMIC DISTRIBUTED DATA ACCESS CONTROL

TECHNICAL FIELD

This description relates to data access control in Information Technology (IT) environments.

BACKGROUND

Access control in an IT environment generally refers to governing authorization to access, or restriction from accessing, data and other resources of a governing entity of the IT environment. For example, in a corporate IT environment, a role-based access control policy may be implemented, according to which a person may be granted access to data based on a role of that person within the corporation. For example, a person in a Human Resources department may have access to social security numbers of employees, while a person in a Marketing department may not.

Many different types of such access control policies may be implemented. Moreover, such access control policies may vary based on many different factors. For example, access control policies may vary based on a nature or type of data being accessed. In other examples, access control policies may change over time with respect to the same underlying data, such as when access is more restricted prior to a product being publicly launched.

Many organizations may have large numbers of employees and other personnel who may be subject to relevant access control policies. Further, many such organizations have large quantities of data, which may be stored using multiple formats and/or multiple types of storage facilities (e.g., different types of database systems). During the normal course of operations, data may be accessed from a storage resource, modified, and returned to the same or different storage resource.

Implementing data access control in these and similar circumstances is difficult. For example, data that has been accessed, modified, and stored again in a different context, may lose an association with a relevant access control policy, or may retain an access control policy that is no longer applicable.

SUMMARY

According to one general aspect, a computer program product may be tangibly embodied on a non-transitory computer-readable storage medium and may include instructions that, when executed by at least one computing device, are configured to cause the at least one computing device to grant an access request for accessed data, the accessed data governed by an access policy. The instructions, when executed by the at least one computing device, are configured to cause the at least one computing device to generate a hash tree for the accessed data. The instructions, when executed by the at least one computing device, are configured to cause the at least one computing device to store the hash tree in conjunction with the access policy. The instructions, when executed by the at least one computing device, are configured to cause the at least one computing device to relate the access policy to uploaded data, based on the hash tree.

According to other general aspects, a computer-implemented method may perform the instructions of the computer program product. According to other general aspects, a system may include at least one memory, including instructions, and at least one processor that is operably coupled to the at least one memory and that is arranged and configured to execute instructions that, when executed, cause the at least one processor to perform the instructions of the computer program product and/or the operations of the computer-implemented method.

The details of one or more implementations are set forth in the accompanying drawings and the description below. Other features will be apparent from the description and drawings, and from the claims.

DETAILED DESCRIPTION

Figure 1:
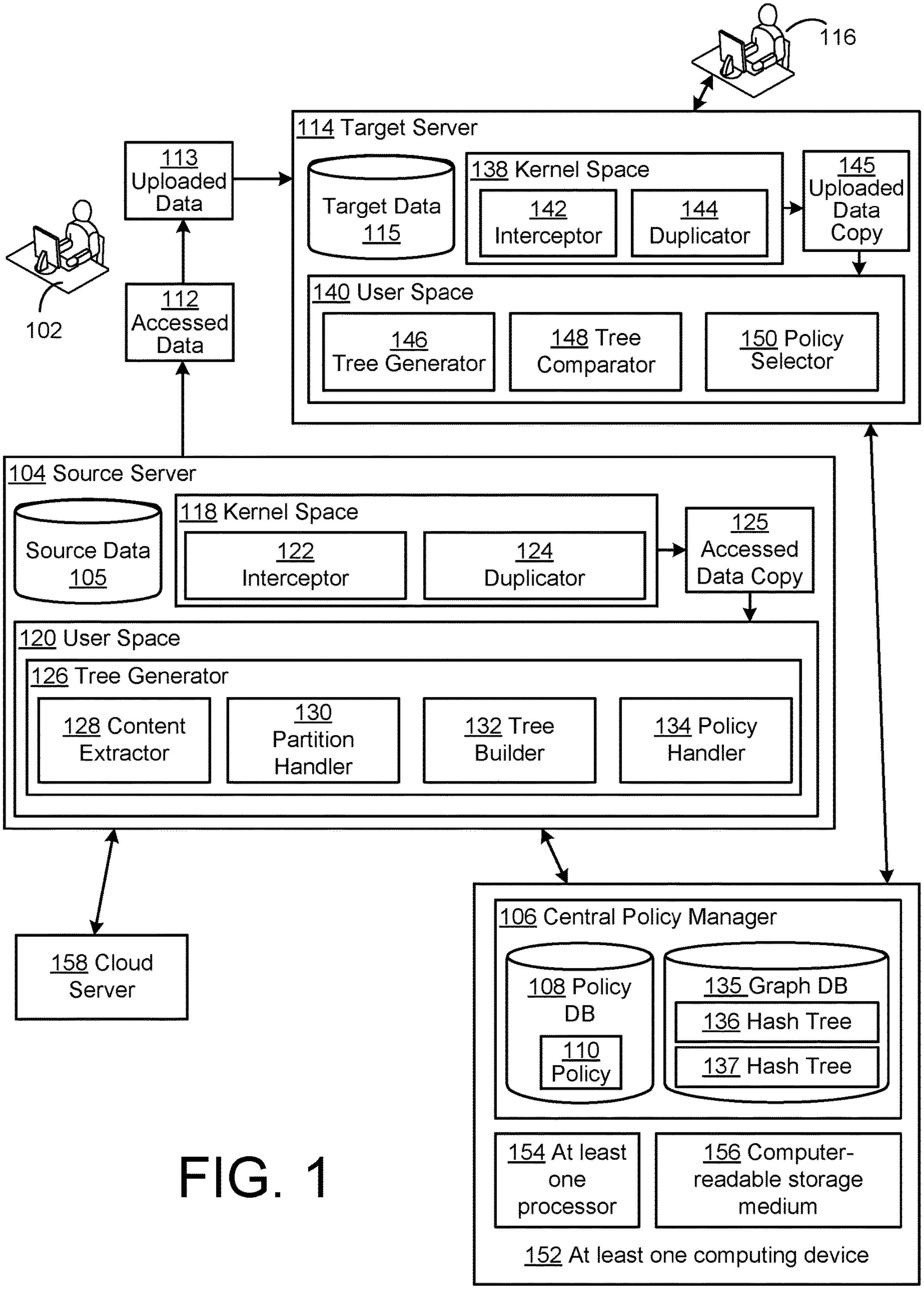
FIG. 1 is a block diagram of system for dynamic distributed data access control.

Described systems and techniques provide fast, reliable, configurable, and efficient data access control for an organization or other entity, even when large quantities of data are frequently being accessed and modified across multiple types of storage contexts. As a result, organizations may reduce or eliminate undesired data access and sharing (and associated harm that may result therefrom), without reducing data access and sharing needed for organizational operations, and without introducing any or appreciable latency into permitted data access operations.

As referenced above, tracking data access across multiple data distributions is challenging, for at least the reason that data in conventional systems can be retrieved and transferred without associated access records. Thus, for example, when data is exported from a database, the data typically loses all access controls that were in (or related to) the database.

Loss of data access management or tracking enables or facilitates undetected data access by malicious or neglectful actors. For example, if data is accessed, updated, and stored in another storage context by an authorized party, the updated stored data in conventional contexts may lose all relevant access control restrictions. As a result, a malicious actor may steal or otherwise use the updated data without detection. For example, intellectual property (e.g., trade secrets) may be obtained and shared outside of an organization, personal information of employees, or other types of harmful data leakage may occur.

Described techniques enable seamless movement of data, while maintaining desired security controls that have been created around that data. Described techniques enable centralization of access policy management, while also enabling granular, e.g., per-user, access control.

For example, described techniques use multiple, intermediate storage systems to generate hash-based representations (e.g., hash-trees) of accessed data, including accessed data that is downloaded, modified, and uploaded from one or more of the intermediate storage systems. Accordingly, the intermediate storage systems may interact with both the individual users accessing data, and the centralized access policy management.

The hash-based representations of the data enable fast, accurate data comparisons, even when compared datasets are only partially the same, so that a corresponding determination may be made as to whether a given access control policy should apply to the data or not. For example, in a first instance, downloaded data that is subject to an access control policy may be only minimally modified, so that the resulting modified data should still be subject to the same access control policy. In a second instance, the downloaded data may be modified extensively, so as to be so dissimilar from the originally downloaded data that the access control policy no longer applies.

Described hash-based data representations enable fine-grained data comparisons between two or more datasets, so that correspondingly fine-grained similarity comparisons may be made between modified data that is being uploaded and multiple datasets associated with an original or different access control policy. Therefore, the modified, uploaded data may be associated, e.g., with the original access control policy, a different access control policy that is more relevant to the data as a result of the modifications, a new access control policy, or no access control policy. For example, one or more similarity characteristics and/or thresholds may be set to make such determinations, or related determinations.

Additionally, described techniques may be implemented in parallel with actual data access operations, so that users experience few or no delays when downloading, accessing, or uploading data. For example, described techniques may detect when access control policy analyses are needed, intercept and copy relevant data being accessed, and execute the types of hash-based similarity comparisons referenced above in a separate, parallel computing context than is used for the downloading, modifying, and/or uploading operations.

Moreover, described techniques may be implemented using informational content of accessed data, as compared, for example, to formatting data, system-specific data, or other metadata that facilitates use of the information data by one or more storage systems. For example, such metadata may be different for a Standard Query Language (SQL) database than for a File Transfer Protocol (FTP) database, or for a storage system using the Windows operating system (OS) as compared to a storage system using the Linux OS. Described techniques may be used to construct the types of hash-based data representations referenced above, while omitting these and other types of metadata. As a result, a quantity of required data processing is reduced, and described techniques are applicable across many different types of storage systems.

FIG. 1 is a block diagram of system for dynamic distributed data access control. In the example of FIG. 1, a user 102 interacts with a source server 104 to access source data 105. A central policy manager 106 is used to maintain a policy database (policy DB) 108, and access of the user 102 to the source data 105 may be governed by one or more security policies, e.g., access control policies, represented in FIG. 1 by a policy 110.

Assuming the user 102 is authenticated against the policy 110 for access to the source data 105, as discussed in more detail, below, the user 102 may be provided with a desired, specified subset of the source data 105, which is illustrated in FIG. 1 as accessed data 112. The accessed data 112 may represent a document, a file, or any collection of data.

The user 102 may utilize the accessed data 112 locally, e.g., at a local workstation of the user 102, including making any needed and allowed changes, updates, or other modifications, resulting in uploaded data 113. As also described below, the user 102 is illustrated in the example of FIG. 1 as a human user, but may also represent an automated user such as an application or service authorized for access.

The user 102 may then wish to upload the uploaded data 113 to a separate server or other data store, illustrated in FIG. 1 as a target server 114, for inclusion in target data 115. The target data 115, including the uploaded data 113, may thus be accessible to other users, represented in FIG. 1 by a second user 116 (where the second user 116 also may represent a human or automated user such as an application or service authorized for access).

As referenced above, and described in more detail below, described techniques and associated implementations of the system of FIG. 1 enable application of the policy 110, or other suitable policy, when the second user 116 attempts to access the uploaded data 113. In contrast, in conventional systems, the uploaded data 113, having been modified or altered from the original accessed data 112 and dissociated from the policy 110, may be undesirably accessible to the second user 116, which may result in unintended, undesired, or malevolent use of the modified data by the second user 116.

In the example of FIG. 1, it is assumed that the user 102, the source server 104, the central policy manager 106, the target server 114, and the second user 116 are all associated with, e.g., part of, an organization or other entity, which is itself subject to some type or extent of centralized control or governance. For example, such an organization may include a corporation or group of corporations, or a government, academic, or non-profit entity.

Various nomenclatures and terms of art may be used to refer to implementations of the system of FIG. 1. For example, the system of FIG. 1 may be referred to as being implemented in a network environment or a technology landscape. For example, such a technology landscape may include a private or local area network of an enterprise, or an application(s) and other resources that are securely provided over the public internet or other network.

Thus, the user 102 and the second user 116 may represent any user with data access or other access rights within an organization providing the system of FIG. 1. For example, the users 102, 116 may represent employees, partners, contractors, administrators, interns, students, or any other person with some role within, or with respect to, the organization that may be associated with a need to access organizational data, such as the source data 105 and the target data 115.

The source server 104 and the target server 114 thus should be understood to broadly represent any data store that might be found within such environments. Such data stores may implement many different platforms, operating systems, applications, databases, database management systems, and various other hardware and software associated with storing corresponding types of data. Various ones of such data stores may thus be associated with different types of formatting, communications protocols, interfaces, programming languages, and other types of metadata. More specific examples of such data stores are provided below, with respect to the example of FIG. 3, or would be apparent. Although described in FIG. 1 with respect to source and target terminology for ease of explanation, it will be appreciated that any given data store within described environments may serve as either a source or target of stored data.

The central policy manager 106 may be configured within a technology landscape of FIG. 1 to be accessible by all data stores that are governed by policies of the policy DB 108, including, e.g., the source server 104 and the target server 114. As described herein, the various policies of the policy DB 108 may represent various types of access policies that govern (e.g., permit, limit, or prevent) access of individuals or groups of users, including, e.g., the user 102 and the second user 116.

As referenced above, existing access policies may enable authentication of various users based on, e.g., an identity or role(s) of such users, perhaps in combination with various other factors, such as a nature of data being accessed, or a time or circumstance in which the data is accessed. In conventional access control systems, however, data, once accessed, is modifiable by an accessing user and it is difficult or impossible to retain an association between newly modified data and an access policy of the original data.

For example, in conventional systems, uploaded data 113, having been modified from accessed data 112 associated with the policy 110, may be uploaded to the target server 114, whereupon the second user 116 may access the uploaded data 113 without further restriction, even if the second user 116 should be prevented from accessing the accessed data 112 and/or the uploaded data 113 by the policy 110.

In other words, data modifications in conventional systems result in loss of association with, and benefit of, the policy 110. For example, if the policy 110 is a role-based access policy, the second user 116 may access the uploaded data 113 in conventional systems, even if the second user 116 does not have a relevant role.

Moreover, FIG. 1 illustrates a simplified example for the sake of explanation and illustration, including only the user 102 and the second user 116. In more complex examples, data pipelines may be established in which available data at a first stage is automatically accessed, processed, and forwarded to a second stage, followed by similar processing at third and subsequent stages, as part of a larger workflow. Since such data pipelines may be implemented at scale, loss of access control over resulting modified data may occur at scale, as well.

In FIG. 1, however, a relationship between the policy 110 and the uploaded data 113 may be maintained, even when a type or extent of modifications applied to the accessed data 112 is not known ahead of time, and even when the uploaded data 113 subsequently undergoes further modifications and/or is stored using a third server (not shown in FIG. 1) as a result of further user access and/or as part of a larger data pipeline.

For example, as shown in FIG. 1, the source server 104 may include a kernel space 118 and a user space 120. The kernel space 118 generally refers to a core portion of an OS of the source server 104, which governs operations of the source server 104 with respect to, among other things, access to the source data 105, for any accessing users or programs, including the user 102.

The user space 120, in contrast, refers to resources of the source server 104 (e.g., processing/memory resources) that have a short-term or long-term association with individual users, such as the user 102. For example, the user 102 may have a user account with the source server 104. In other examples, the user space 120 may be allocated for the user 102 and used during the data access operations described herein, and then removed to conserve resources of the source server 104.

Thus, the kernel space 118 may be configured to govern all access requests from all potentially authorized users, including the user 102. Meanwhile, the user space 120 may be particular to the user 102, or to a group of relevant users for whom access control is desired.

By maintaining separation between the kernel space 118 and the user space 120, the source server 104 is capable of continually processing access requests by the user 102 and various other users, using resources of the kernel space 118, while the user space 120 is separately and simultaneously used to ensure that the policy 110 remains associated with the uploaded data 113. Put another way, described techniques may be implemented to provide desired types and levels of access control during data access operations, without inhibiting an availability or increasing a latency of the data access operations, themselves.

In more detail, the source server 104 may include an interceptor 122 and a duplicator 124. The interceptor 122 may be configured to intercept the accessed data 112 in conjunction with its download to the user 102, and the duplicator 124 may be configured to duplicate the accessed data 112 to obtain an accessed data copy 125.

Then, as referenced above, further processing of the accessed data copy 125 may proceed by the user space 120, without interfering with authentication, downloading, and other operations of the kernel space 118. Specifically, a tree generator 126 in the user space 120 may include a content extractor 128 configured to extract content from the accessed data copy 125, while removing or ignoring various types of metadata not needed for access control, as referenced above and described in more detail, below.

Then, a partition handler 130 may partition the extracted content into multiple partitions, which may then be processed by a tree builder 132 configured to calculate a hash of each partition and of combinations of adjacent partitions, to obtain a hash tree 136. As shown, the hash tree 136 may be stored within a graph database (graph DB) 135 of the central policy manager 106. A policy handler 134 may be configured to associate the policy 110 relevant for access with the hash tree 136.

As described in detail, below, the hash tree 136 uniquely represents the accessed data 112 as a whole, while individual portions (e.g., leaves) of the hash tree 136 uniquely represent corresponding portions of the accessed data 112, as well. Associating the policy 110 with the hash tree 136 thus relates the policy 110 to the accessed data 112 as a whole, and to subsets or portions of the accessed data 112.

Example techniques for generating the hash tree 136 are described below. For example, the tree builder 132 may implement one or more suitable hash functions to input a data partition(s) (and combinations of partitions) from the partition handler 130, and to output a corresponding hash value(s), or hash(es).

Hash functions, in general, may be used to transform a data partition to a hash value (often of fixed size) that is unique or nearly unique to the underlying data partition (at least within the context of the system of FIG. 1) in a reproducible manner. For example, a data partition input to a hash function being used at a first time will result in the same hash value obtained when the same data partition is input to the same hash function at a second, later time, and that hash value is very unlikely to be obtained from any other non-duplicative data partition. Examples of such hash function are well known, and may include, e.g., variations of the Secure Hashing Algorithm (SHA), or more simplified hash functions, such as checksums or cyclic redundancy checks.

The hash tree 136 may thus include a root, a branch, and/or a leaf structure of hash values of corresponding data partitions. For example, the hash tree 136 may be constructed as a binary hash tree, e.g., a Merkle tree, in which data partitions are individually hashed, and then pairs of data partitions are concatenated and hashed again to obtain another level of the tree, and this process is repeated until an entirety of the dataset (e.g., all of the accessed data copy 125) is hashed. The hash of the entire data set thus provides a root hash, which thus represents the entire data set. In particular examples described below, the hash tree 136 is described as a Merkle tree, which is a particular type of binary hash tree suitable for use in the system of FIG. 1. Examples of Merkle trees are illustrated with respect to FIGS. 4-6, for the sake of illustration and explanation. However, other types of hash trees may be used, as well.

The target server 114 also includes a kernel space 138 and a user space 140. When the uploaded data 113 is uploaded to the target server 114 (perhaps in association with required authentication, not shown or discussed with respect to the target server 114), an interceptor 142 of the kernel space 138 may be configured to intercept the uploaded data 113 for duplication by a duplicator 144, which results in an uploaded data copy 145.

Analogously to operations of the kernel space 118, the kernel space 138 may facilitate upload of the uploaded data 113 without increasing an upload latency, while the user space 140 separately utilizes the uploaded data copy 145 to maintain desired types and levels of access control. For example, the user space 140 includes a tree generator 146, which corresponds to the tree generator 126, and which may include (although not shown in FIG. 1) one or more modules corresponding to the content extractor 128, the partition handler 130, the tree builder 132, and the policy handler 134.

Therefore, the tree generator 146 may generate a hash tree 137 that uniquely corresponds as a whole to the uploaded data 113 and that includes hash tree portions that uniquely represent corresponding portions of the uploaded data 113. A tree comparator 148 may thus compare the hash tree 137 against all or a desired subset of the hash trees in the graph DB 135. A policy selector 150 may thus select one or more policies, potentially including the policy 110, as applying to the uploaded data 113, based on the hash tree comparisons.

In a simplified example of FIG. 1, the uploaded data 113 may include few or no significant changes to data content of the accessed data 112. For example, the user 102 may make changes only to metadata of the accessed data 112, and not to the data content itself from which the hash trees 136, 137 are generated.

In such a case, the hash tree 137 will largely or completely match the hash tree 136, and the policy selector 150 may proceed to associate the policy 110 with both the accessed data 112 and the uploaded data 113. In this scenario, it may not be necessary to retain the hash tree 137, as it would be largely or completely duplicative of the hash tree 136.

In other scenarios, content of the uploaded data 113 may be changed in more non-trivial manners. For example, content portions may be deleted or replaced. In these scenarios, the hash tree 137 will only partially match the hash tree 136. The policy selector 150 may be configured to determine whether the partial match is sufficient to warrant linking of the uploaded data 113 and the hash tree 137 to the policy 110. For example, a similarity threshold or similarity condition may be set to determine whether linking is warranted. In these cases, the hash tree 137 may be maintained in the graph DB 135 in addition to the hash tree 136.

The simplified example of FIG. 1 illustrates only the policy 110 as a single policy, but it will be appreciated that many policies may be stored in the policy DB 108. Therefore, the tree comparator 148 may be configured to query the graph DB 135 to compare the hash tree 137 against all stored hash trees and associated policies, including but not limited to the hash tree 136 and the policy 110.

As a result, the uploaded data 113 may potentially match one or more such hash trees/policies. In such cases, it may be possible or desirable to maintain relationships between a given hash tree (and associated data) and multiple policies. In other scenarios, a single policy that most closely matches a current hash tree may be selected, based on a suitable selection criteria. Thus, relationships between policies and hash trees (data) may be 1:n, n:1, or n:n.

In FIG. 1, the central policy manager 106 is illustrated as being implemented using at least one computing device 152, including at least one processor 154, and a non-transitory computer-readable storage medium 156. That is, the non-transitory computer-readable storage medium 156 may store instructions that, when executed by the at least one processor 154, cause the at least one computing device 152 to provide the functionalities of the central policy manager 106 and related functionalities.

Although the at least one computing device 152 is illustrated in FIG. 1 only with respect to the central policy manager 106, it will be appreciated that the source server 104 and the target server 114 will also be implemented using corresponding processing and memory resources to implement the various functionalities and modules illustrated and described with respect to FIG. 1. Moreover, although FIG. 1 illustrates the source server 104, the central policy manager 106, and the target server 114 as three separate devices, it will be appreciated that various ones of the functionalities and modules illustrated in a particular context may be implemented in other contexts as well. For example, the central policy manager 106 may be implemented on the same physical or virtual hardware as the source server 104, as long as central access is provided with respect to such hardware.

Moreover, although the system of FIG. 1 has primarily been described with respect to a single, closed technology landscape, it will be appreciated that such a technology landscape may nonetheless be extended to include resources available over a public network. For example, such resources may be included as part of a virtual private network (VPN). In other examples, as shown in FIG. 1, a cloud server 158 that may not be part of (e.g., under control of) an organization providing the landscape of FIG. 1 may still be used in the context of FIG. 1. For example, the accessed data 112 may be stored using the cloud server 158, but may still be subjected to the same procedures described above with respect to the source data 105, when accessed by the user 102.

Figure 2:
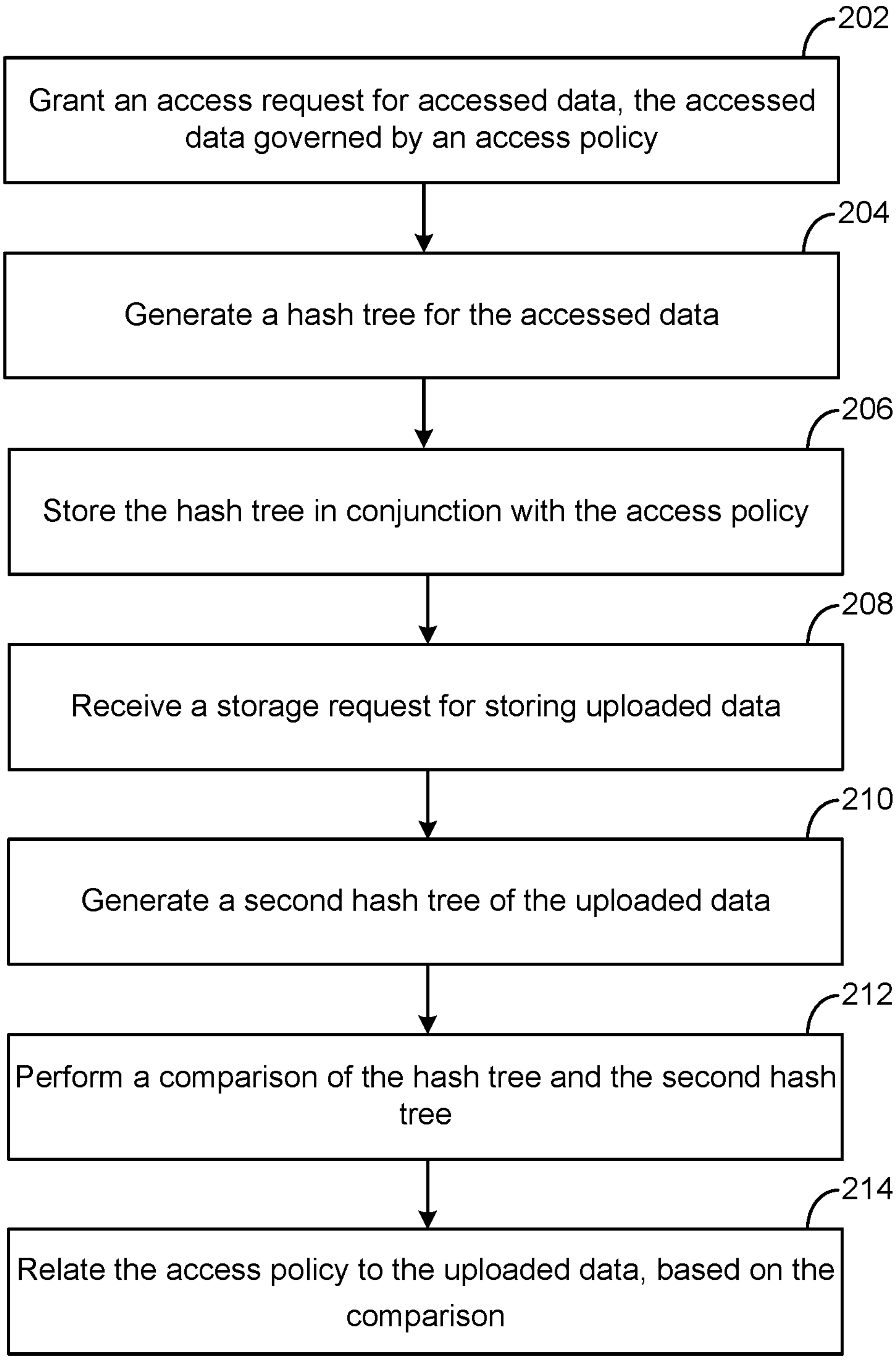
FIG. 2 is a flowchart illustrating example operations of the system of FIG. 1.

FIG. 2 is a flowchart illustrating example operations of the system of FIG. 1. In the example of FIG. 2, operations 202 to 214 are illustrated as separate, sequential operations. In various implementations, the operations 202 to 214 may include suboperations, may be performed in a different order, may be performed iteratively, may include alternative or additional operations, or may omit one or more operations or suboperations.

In the example of FIG. 2, an access request may be granted for accessed data that is governed by an access policy (202). As described above, the user 102 or an accessing application may be granted permission (e.g., authenticated) to download the accessed data 112 from the source server 104, or from the cloud server 158, based on content of the policy 110 within the central policy DB 108.

A hash tree may be generated for the accessed data (204). For example, the accessed data 112 may be duplicated at the kernel space 118 to obtain the accessed data copy 125, which may be passed to the user space 120. There, the tree generator 126 may proceed to generate the hash tree 136, e.g., as a binary hash tree, or a Merkle tree, which may be stored in the graph DB 135.

The hash tree may be stored in conjunction with the access policy (206). For example, a root of the hash tree 136 in the graph DB 135 may be linked to the policy 110 in the policy DB 108.

At a later time, a storage request may be received for storing uploaded data (208). For example, the user 102 may have modified the accessed data 112 to obtain the uploaded data 113, e.g., by deleting, adding, and/or inserting data, so that at least a portion of the accessed data 112 remains the same or substantially the same, while another portion of the accessed data 112 has been modified or altered.

A second hash tree of the uploaded data may be generated (210). For example, the storage request may be intercepted at the kernel space 138 of the target server 114, which may then duplicate the uploaded data to obtain the uploaded data copy 145. The tree generator 146 may then generate the second hash tree 137, using the uploaded data copy. It will be appreciated that no knowledge of the accessed data 112, or of any relationship between the accessed data 112 and the uploaded data 113, is required for the process of generating the second hash tree 137.

A comparison of the hash tree and the second hash tree may be performed (212). For example, the tree comparator 148 may query the graph DB 135, which may contain many hash trees (corresponding to other data), in addition to the hash tree 136. The tree comparator 148 may determine a degree of similarity between the second hash tree 137 and all potentially matching hash trees of the graph DB 135, including the hash tree 136. For example, the tree comparator 148 may determine a subset of hash trees of the graph database that are above a similarity threshold with respect to the second hash tree 137.

The access policy may be related to the uploaded data, based on the comparison (214). For example, the policy selector 150 may identify the second hash tree 137 from among a plurality of potentially matching hash trees identified by the tree comparator 148. It will be appreciated that the policy selector 150 may select two or more hash trees as corresponding to the first hash tree 136. For example, a third hash tree (not shown) may be identified as matching the hash tree 137 and uploaded data 113, and the second hash tree 137 and uploaded data 113 may be related to a second access policy (not shown) of the policy DB 108, which corresponds to underlying data of the third hash tree.

Figure 3:
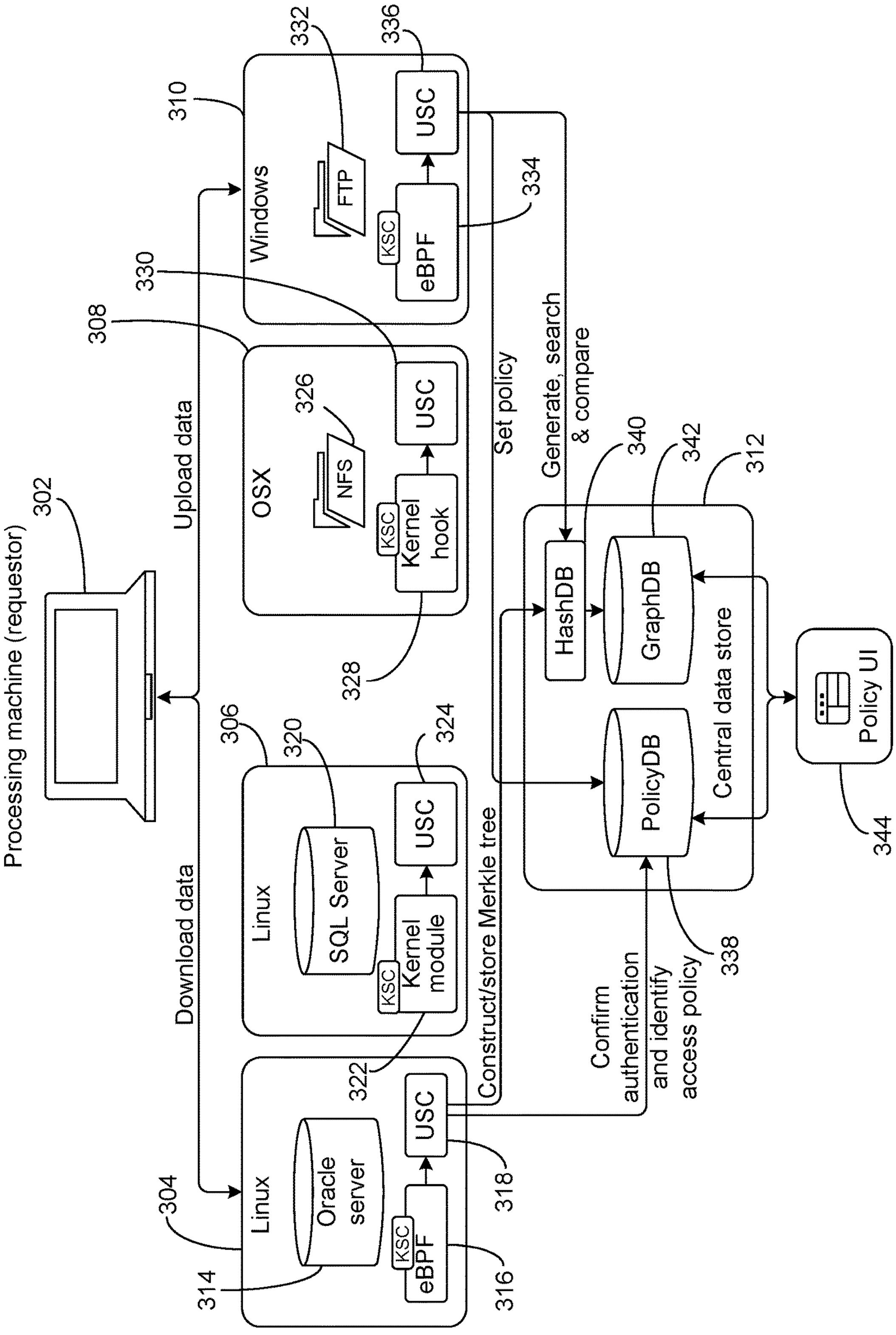
FIG. 3 is a block diagram illustrating an example implementation of the system of FIG. 1.

FIG. 3 is a block diagram illustrating an example implementation of the system of FIG. 1. In the example of FIG. 3, a processing machine 302 acts as a requestor of data and may also upload data. The processing machine 302 may be, e.g., a desktop, a workstation of a person moving data, or an automation endpoint that automates the movement of data.

Data may be hosted on a plurality of data hosts, represented in FIG. 3 by a host 304, a host 306, a host 308, and a host 310. The hosts 304, 306, 308, 310 correspond generally to example implementations of either the source server 104 or the target server 114 of FIG. 1. A central data store 312 represents an example implementation of the central policy manager 106 of FIG. 1.

As noted above, the hosts 304, 306, 308, 310 may represent physical or virtual machines, and may be used to implement various OSs and/or storage and/or file systems. For example, the host 304 is illustrated as a Linux system providing an Oracle server 314, the host 306 is illustrated as a Linux system providing an SQL server 320, the host 308 is illustrated as an OSX system providing a network file system (NFS) 326, and the host 310 is illustrated as a Windows system providing a file transfer protocol (FTP) data store 332. Of course, the above examples are non-limiting, and included to illustrate the diversity of contexts in which described techniques may be used.

Further in FIG. 3, the host 304 includes a kernel space component (KSC) 316 and a user space component (USC) 318, corresponding generally to the kernel space 118 or 138 of FIG. 1 and to the user spaces, 120 or 140 of FIG. 1, respectively. The host 304 may implement the KSC 316 as an extended Berkeley Packet Filter (eBPF) component, which is a virtual component within the Linux kernel that allows desired programs to run without requiring modifications of existing kernel source code.

The host 306 may implement a kernel module as a KSC 322, in conjunction with a USC 324. The host 308 may implement a kernel hook as a KSC 328, in conjunction with a USC 330. The host 310 may implement an eBPF module as a KSC 334, in conjunction with a USC 336.

By way of more specific example, the KSC 316 of the host 304 may be understood to utilize Linux eBPF events implemented by eBPF logic that may be broken down into logic running in two different segmented portions of the Linux operating system. The USC 318 may run on the operating system with user-space privileges, and may be responsible for, e.g., deploying the KSC 316 at host 304 startup and collecting data passed off by the KSC 316, as well as the various functions described above with respect to FIG. 1.

The KSC 316 may generally represent any component running on the OS with kernel space privileges. The KSC 316 may be configured to intercept accessed data 112 and forward it to the USC 318, as also described above.

The central data store 312 includes a policy DB 338, which stores access policies for data stored in all protected datastores. Policies may be setup by relevant administrators or designers of such systems.

A hash database (hash DB) 340 represents a database that is optimized for storing hashes and links therebetween, in conjunction with, or as part of, a graph database (graph DB) 342. Links within the hash DB 340 that point to corresponding policies in the policy DB 338 may be included.

Interconnecting, directional arrows in FIG. 3 illustrate that the processing machine 302 may download and upload data between any two of the hosts 304, 306, 308, 310. As shown, downloading from host 304 is associated with authentication confirmation by the USC 318 against the policy DB 338, which may initially associate a relevant policy with the data being downloaded, and associated construction of a corresponding hash (e.g., Merkle) tree stored using the hash DB 340 and the graph DB 342.

As further illustrated, upload of modified or other uploaded data to the host 310 may be associated with generate, search, and compare operations to generate a Merkle tree for the uploaded data and then compare the newly generated Merkle tree against other Merkle trees in the hash DB 340 and graph DB 342 to determine a sufficient match with at least the previously generated Merkle tree obtained from the previously downloaded data. Accordingly, the access policy of at least the previously downloaded data may be associated with newly uploaded data.

A policy UI 344 represents a user interface configured to create new access policies and manage existing access policies associated with datasets in datastores. The policy UI 344 may also be used to notify users of new, unidentified datasets that may be required to be linked with a new or existing access policy.

Thus, described techniques enable seamless movement of data while maintaining security controls that were created around the data. FIG. 3 provides an example of achieving the preceding and related results, without impacting database performance, by using event-based technology such as eBPF, kernel space, and user-based processes, as just described with respect to FIG. 3. In addition, data security measures may be maintained on a subset of data, in addition to the entire data set, by using similarities computed using hash trees, such as Merkle Trees. Existing data security policies may be dynamically applied to new data sets as well, based on matching data profiles (stored as Merkle trees) in real time.

Figure 4:
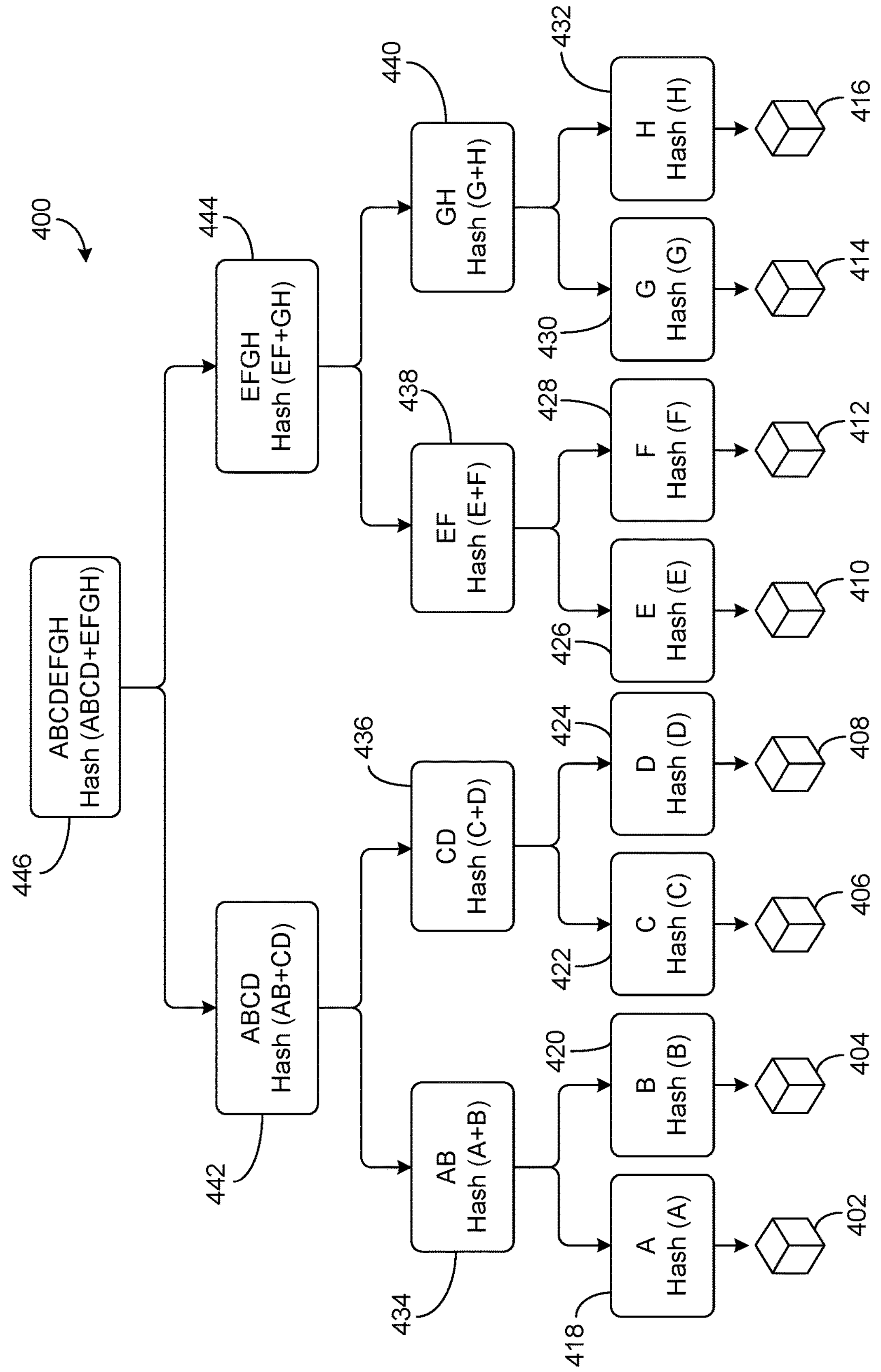
FIG. 4 is an example hash tree used in the systems of FIGS. 1-3.

FIG. 4 is an example hash tree 400 used in the systems of FIGS. 1-3. FIG. 4 illustrates example data partition 402, example data partition 404, example data partition 406, example data partition 408, example data partition 410, example data partition 412, example data partition 414, and example data partition 416. In FIG. 4, the above-referenced data partitions are also referenced as data partitions A, B, C, D, E, F, G, and H, so that combinations or concatenations of such data partitions may be easily referenced as, e.g., A+B, C+D, AB+CD, E+F, G+H, EF+GH, or ABCD+EFGH.

The above-referenced data partitions illustrated in FIG. 4 may thus be understood to represent results of operations of the partition handler 130 of FIG. 1. For example, as described with respect to FIG. 1, the partition handler 130 may input the accessed data copy 125 and output equal-sized partitions of data. A size of each partition may be preset to a desired value, such as, e.g., 1K, 2K, 4K, 8K, or 16K bytes of data.

Partition size thus represents a configurable parameter that may be set and updated as needed by an administrator or designer of the tree generator 126 and the tree generator 146 of FIG. 1. In general, smaller partition sizes require more data processing during subsequent attempts to compare and match different hash trees, but provide more opportunities for successful matching (e.g., more granular data matching), while larger partition sizes require less data processing during subsequent attempts to compare and different hash trees, but provide fewer opportunities for successful matching (e.g., less granular data matching).

As further illustrated in FIG. 4, operations of the tree builder 132 of FIG. 1 may proceed with calculating a hash value for each of the data partitions 402, 404, 406, 408, 410, 412, 414, 416. That is, a hash value 418 is calculated for the data partition 402, a hash value 420 is calculated for the data partition 404, a hash value 422 is calculated for the data partition 406, a hash value 424 is calculated for the data partition 408, a hash value 426 is calculated for the data partition 410, a hash value 428 is calculated for the data partition 412, a hash value 430 is calculated for the data partition 414, and a hash value 432 is calculated for the data partition 416.

Then, a hash value is generated for each pair of the calculated hash values, e.g., for each concatenated pair of underlying data partitions. As shown, a hash value 434 is calculated for a concatenation of data partitions 402, 404 of hash values 418, 420, a hash value 436 is calculated for a concatenation of data partitions 406, 408 of hash values 422, 424, a hash value 438 is calculated for a concatenation of data partitions 410, 412 of hash values 426, 428, and a hash value 440 is calculated for a concatenation of data partitions 414, 416 of hash values 430, 432.

Similarly, a hash value 442 is calculated for a concatenation of data partitions AB+CD (i.e., for data partitions 402, 404, 406, 408), and a hash value 444 is calculated for a concatenation of data partitions EF+GH (i.e., for data partitions 410, 412, 416, 418). Finally in FIG. 4, a hash value 446 is calculated for a concatenation of data partitions ABCD+EFGH (i.e., for all data partitions 402, 404, 406, 408, 410, 412, 414, 416). As described in detail, below, the final hash value 446 thus represents a root of the hash tree 400 of FIG. 4 and may be used to link the hash tree of FIG. 4 (and thus an entirety of the corresponding data), to a relevant access policy.

Figure 5:
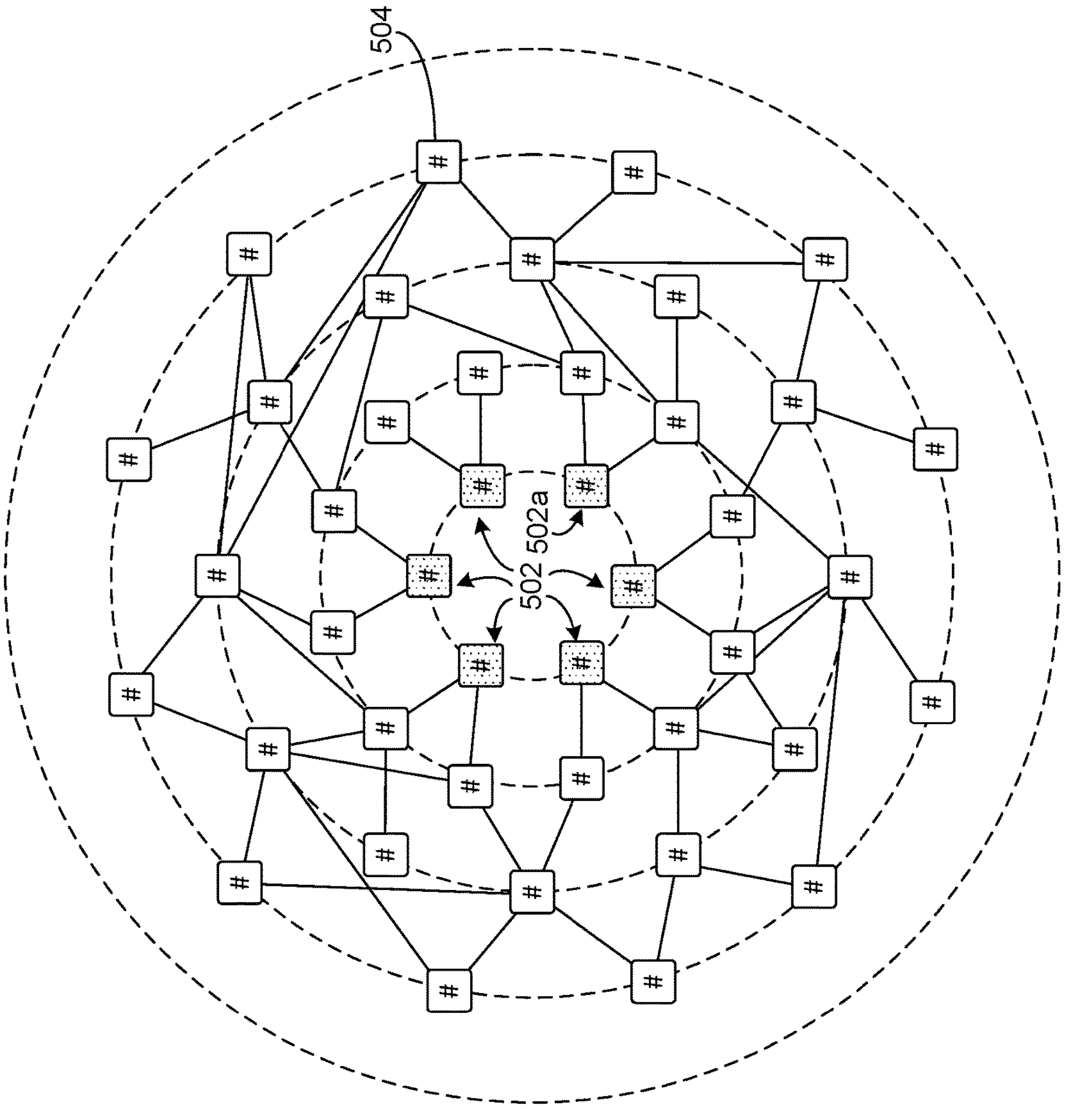
FIG. 5 illustrates use of a graph database of FIGS. 1-3 to store multiple hash trees.

FIG. 5 illustrates use of a graph database of FIGS. 1-3 to store multiple hash trees. FIG. 5 also illustrates efficiencies that may be gained in storing and comparing hash trees for dynamic data access control, as described herein.

In FIG. 5, a plurality of nodes 502 represent root nodes of corresponding hash trees. For example, a root node **502*a* may correspond to the root hash, node 446, of FIG. 4. Thus, each of the concentric circles/layers of FIG. 5 represents a corresponding level of the hash tree of FIG. 4. For example, an outermost or leaf node 504 may correspond to one of the originally computed hash values 418, 420, 422, 424, 426, 428, 430, 432 of FIG. 4**.

FIG. 5 further illustrates that duplications and/or redundancies may exist within calculated hash values of the various graph nodes (i.e., entities corresponding to hash values). A number or frequency of such duplications and/or redundancies may depend on various factors, such as a nature and content of underlying data sets, a type of hashing algorithm being used, and/or a size of data partitions being used.

For example, some data sets, by their nature or virtue of their intended use, may include duplicative data. Further, when relatively small data partitions are used, a number of possible combinations of underlying bit values is reduced, so that, for large quantities of data, it becomes relatively more likely that duplicated hash values and duplicated concatenated hash values may occur.

Obtaining such redundancies in the extreme (e.g., selecting extremely small partition sizes) may lead to excessive numbers of required calculations to obtain overly duplicative hash trees. On the other hand, a presence of such redundancies in a more limited quantity may result in more efficient graph storage and faster comparisons when comparing pairs of hash trees. Put another way, described techniques provide various trade-offs and design choices between partition size, granularity of potential data matches, number of computations required, speed of hash tree comparisons, and quantity of memory required for graph storage, among other factors.

Figure 6:
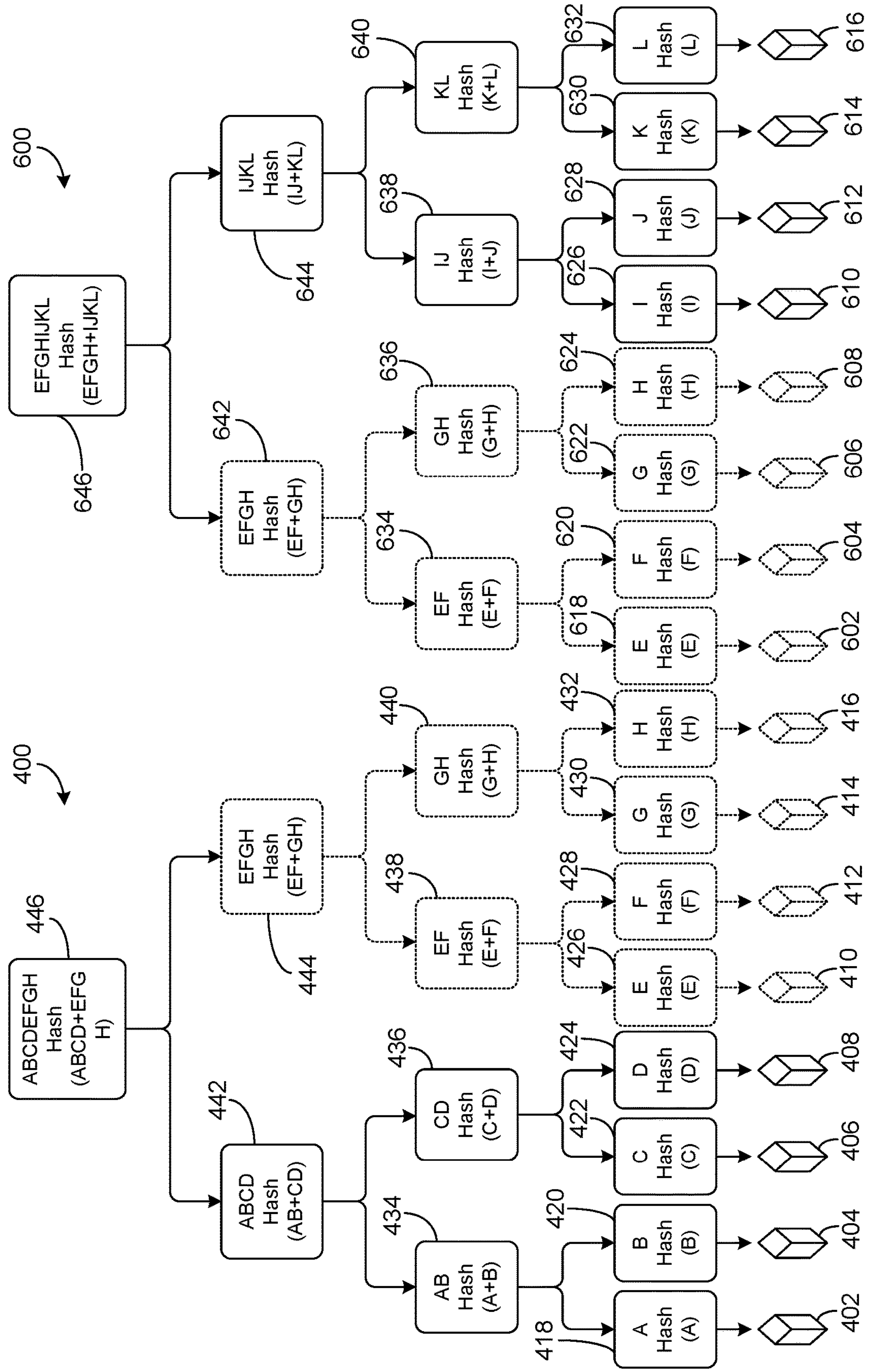
FIG. 6 illustrates an example comparison of multiple hash trees of FIGS. 4 and 5.

FIG. 6 illustrates an example comparison of multiple hash trees of FIGS. 4 and 5. That is, FIG. 6 illustrates a comparison of the hash tree 400 of FIG. 4 with a hash tree 600, both of which may be stored using the techniques described with respect to FIG. 5.

In FIG. 6, the hash tree 400 may represent a hash tree constructed for the accessed data copy 125 of FIG. 1 when the accessed data 112 is downloaded from the source server 104 (e.g., the hash tree 136 of FIG. 1), while the hash tree 600 may represent a hash tree constructed for the uploaded data copy 145 of FIG. 1 when the uploaded data 113 is uploaded to the target server 114 (e.g., the hash tree 137 of FIG. 1).

FIG. 6 illustrates example data partition 602, example data partition 604, example data partition 606, example data partition 608, example data partition 610, example data partition 612, example data partition 614, and example data partition 616. As in FIG. 4, the above-referenced data partitions are also referenced as data partitions E, F, G, H, I, J, K, and L, so that combinations or concatenations of such data partitions may be easily referenced as, e.g., E+F, EF+GH, or I+J, K+L, IJ+KL, or EFGH+IJKL.

As further illustrated, and as already described with respect to FIG. 4, hash value 618 may be determined from partition 602, hash value 620 may be determined from partition 604, hash value 622 may be determined from partition 606, hash value 624 may be determined from partition 608, hash value 626 may be determined from partition 610, hash value 628 may be determined from partition 612, hash value 630 may be determined from partition 614, and hash value 632 may be determined from partition 616.

Then, hash values 634, 636, 638, 640, 642, 644, and 646 may be calculated for underlying pairs of data partitions or concatenated data partitions, as shown and as previously explained for FIG. 4. Root hash value 646 of the hash tree 600 thus corresponds to one of the root nodes 502 of FIG. 5, similarly to the root node 446 of the hash tree 400.

In FIG. 6, dashed lines are used to indicate matches between corresponding partitions and hash values that may be determined when comparing the hash trees 400, 600. As shown, hash value 426 for data partition 410, hash value 428 for data partition 412, hash value 430 for data partition 414, and hash value 432 for data partition 416 of the hash tree 400 are determined to correspond to hash value 618 for data partition 602, hash value 620 for data partition 604, hash value 622 for data partition 606, and hash value 624 for data partition 608 of the hash tree 600. Similarly, hash value 438 and hash value 440 are determined to correspond to hash value 634 and hash value 636, and hash value 444 is determined to correspond to hash value 642.

FIG. 6 thus illustrates an example in which a certain portion, degree, percentage, or extent of the hash trees 400, 600 match one another. In the example, of two sets of eight data partitions ABCDEFGH and EFGHIJKL, four or 50% of the data partitions are determined to correspond (i.e., EFGH), based on the matching of hash values 444 and 644, and of underlying hash values within the hash trees 400, 600.

Of course, any extent of matching may occur during an actual comparison, ranging from a failure to match any partition or hash value to matching root nodes 446, 646 (which would indicate a match of the entireties of the underlying datasets). As described herein, the degree or extent of such matching may be used to determine whether an access policy of the underlying data of the hash tree 400 should be related or linked to the underlying data of the hash tree 600 (e.g., with reference to FIG. 1, whether the access policy 110 of the accessed data 112, represented by the hash tree 136, should be related to the uploaded data 113, represented by the hash tree 137, based on a comparison of the hash trees 136, 137).

Figure 7:
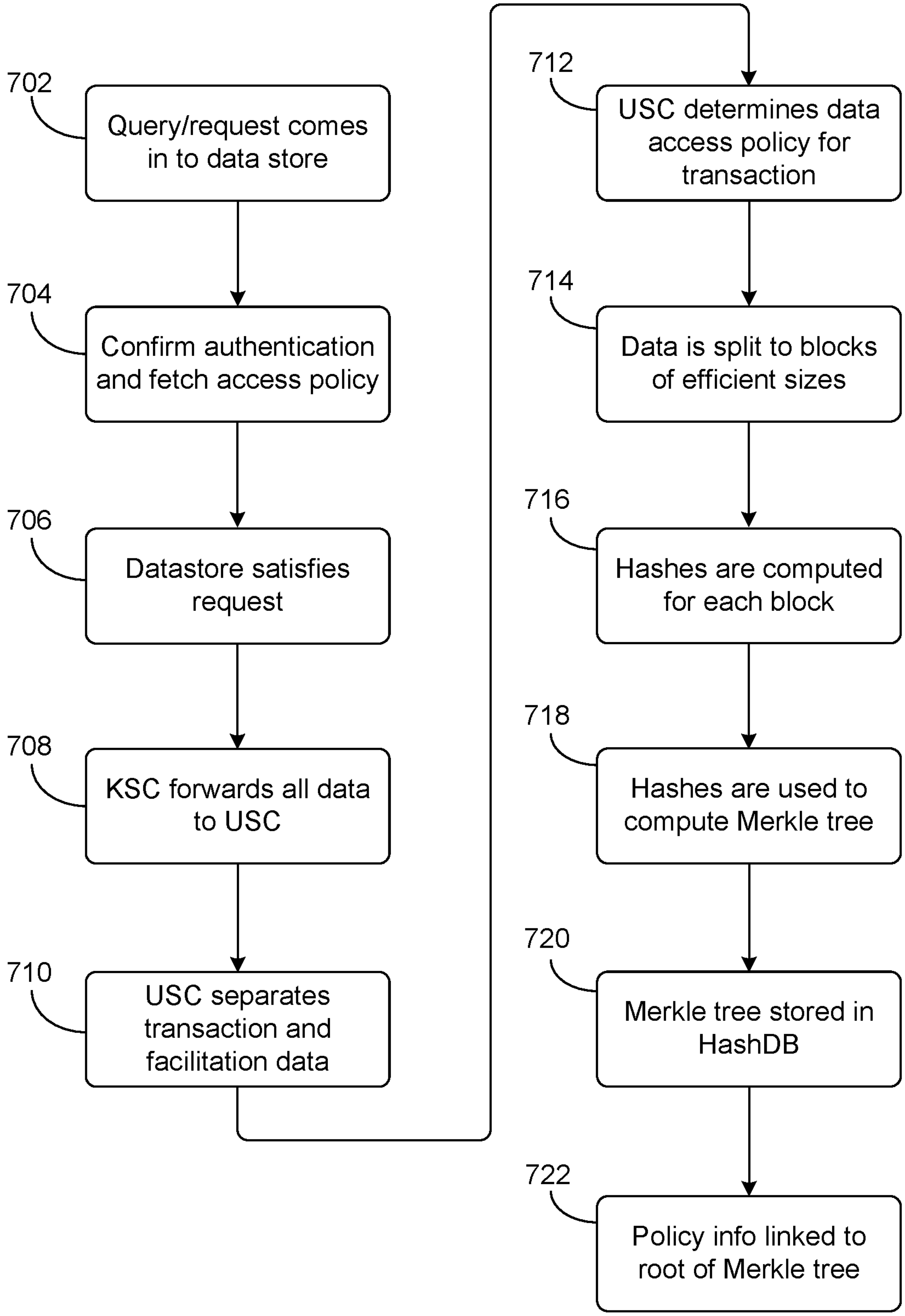
FIG. 7 is a flowchart illustrating example techniques for requesting data access using the techniques of FIGS. 1-6.

FIG. 7 is a flowchart illustrating example techniques for requesting data access using the techniques of FIGS. 1-6. In the example of FIG. 7, an initial query/request comes in to a datastore (702) from a remote requestor.

Then, authentication may be confirmed and relevant access policy may be fetched (704). For example, for every data fetch or manipulation request that comes in, the requestor may be validated against a relevant policy DB 108 to ensure the requester is permitted to access the data in the requested dataset from the datastore. The applicable policy is also fetched from the policyDB 108 for later use. Such authentication and fetching may be performed as a synchronous blocking method, e.g., the query is not allowed to proceed without authentication and fetching being performed. Authentication may be performed using packet matching to identify initial incoming packets that contain authentication information and requests, followed by a local map check of cached access policies. As referenced above, authentication and access policy retrieval may be performed through hooks provided by the datastore or by methods of interception such as, but not limited to, instrumentation.

Once authentication and/or policy fetching is completed, the datastore may satisfy the request by providing the requested data (706). After authentication, the KSC forwards all the data exchanged to the USC (708). As described, this approach enables data processing of all data exchanged between requestor and datastore to occur out of band for performance purposes (e.g., does not prevent or delay the originally requested data download).

The USC may then separate transaction and facilitation data (710). That is, as described above, any given data set may include both content that is related to the requested transaction, as well as metadata that facilitates the transaction but that is not unique to, or otherwise useful for, access policy determinations as described herein.

Examples of such facilitation data may include, but are not limited to, protocol headers, message encodings, authentication data, and/or compression metadata. These and other types of facilitation data may vary, e.g., in size, type, or extent size, or other quantity or quality. For example, a size of a packet header may be different in two different contexts.

For example, such facilitation data or metadata may vary among different, e.g., systems or applications. For example, with reference back to FIG. 3, data stored by each of the hosts 304, 306, 308, 310 may have different types or extents of facilitation data. Moreover, each of the Oracle server 314, SQL server 320, NFS 326, and FTP 332 systems may have different types or extents of facilitation data.

Consequently, it may be desirable to modify or train the content extractor 128 of FIG. 1 to filter facilitation data differently from different datasets, depending on an underlying nature(s) of the datasets. New or different types of hosts, systems, or applications may be integrated into the systems of FIGS. 1 and 3 by configuring the content extractor 128 in a desired manner.

Once transaction data or other content is determined, the user space component may determine a suitable access policy for the requested transaction (e.g., download) (712). For example, as shown in FIG. 3, the USC 318 may identify a relevant access policy from the policy DB 338.

Transaction data may then be split into blocks of efficient sizes (714), which may be partitions of suitable, pre-configured size. A hash value for each block may be computed (716) independently, as described, e.g., with respect to FIGS. 4 and 6. As also described with respect to FIGS. 4 and 6, hash values of pairs of concatenated partitions may be successively and iteratively computed and hashes used to compute a Merkle tree (718) for an entire data set.

Then, the computed Merkle tree is stored in the hash DB (720). This is illustrated in FIG. 3, where a USC such as the USC 318 may connect to the hash DB 340 and/or the graph DB 342. The previously determined access policy may then be linked to the root of the computed Merkle tree (722). The computed Merkle tree thus provides a signature or representation for the associated data set that may be used to understand whether one or more other data sets, represented by their own Merkle tree(s), matches the data set of FIG. 7.

Figure 8:
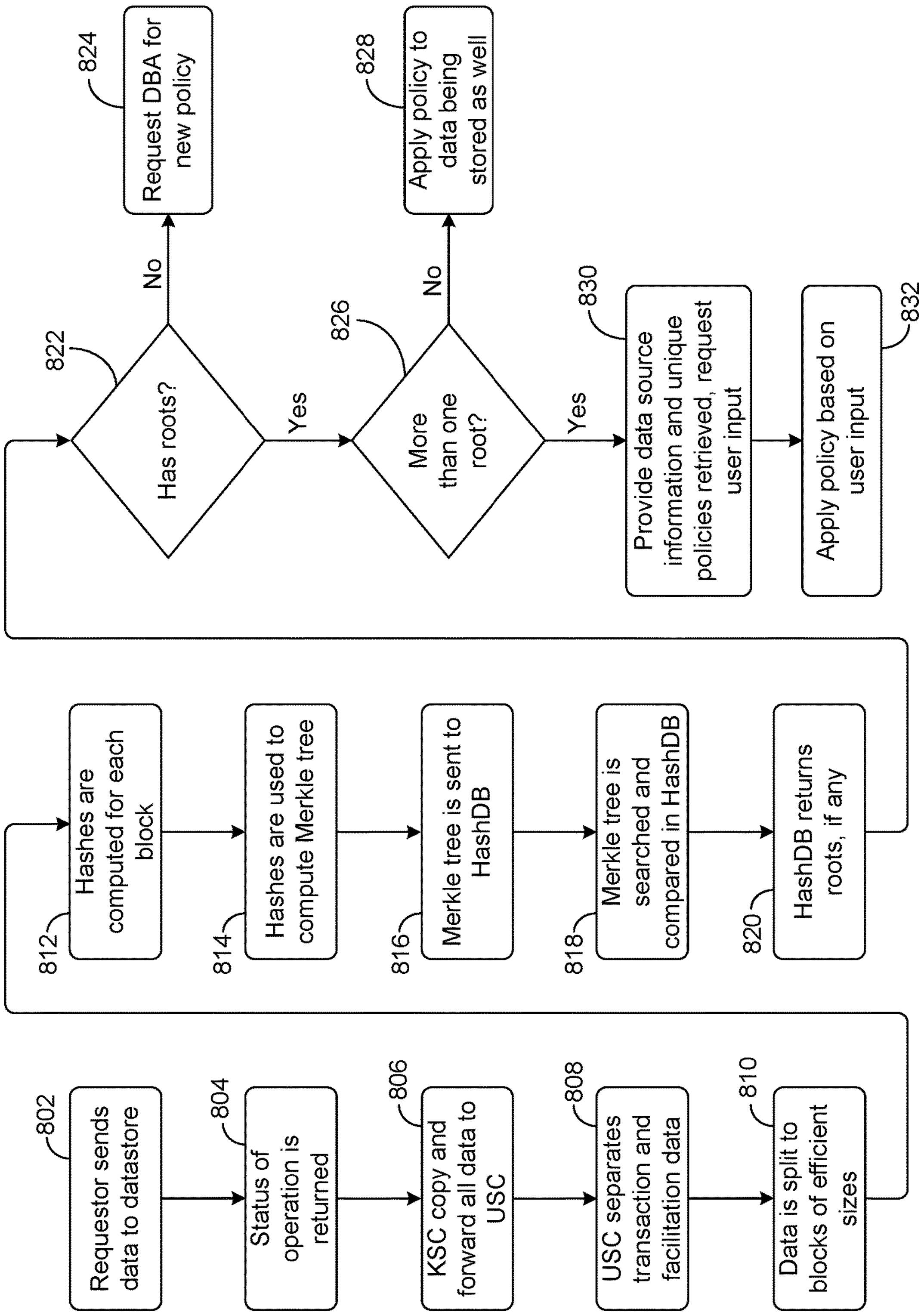
FIG. 8 is a flowchart illustrating example techniques for storing data using the techniques of FIGS. 1-6.

FIG. 8 is a flowchart illustrating example techniques for storing data using the techniques of FIGS. 1-6. In FIG. 8, a requestor sends, e.g., uploads, a data set to a datastore (802). The data set being uploaded may be modified from a previously uploaded data set or may be a new data set that has been created, or that has been compiled or aggregated from existing data sets.

The uploading process may include various details, some of which are referenced above, that are not explicitly illustrated in FIG. 8. For example, an authentication process may be conducted that is similar to previously described authentication techniques. With reference to the example of FIG. 3, the authentication and uploading processes may trigger related processes, such as, e.g., sockets opened by a database server upload process may trigger eBPF connection hooks. A nature of the transaction may be determined in some cases from unencrypted data exchanged between the data store being accessed and the requestor, such as read/write calls triggered when tracked database sockets exist in a single call chain. Hooks registered with shared libraries or database interfaces in a single call chain may be used to gather a context of the transaction, including, e.g., callback hooks with cloud datastores (such as the cloud server 158 of FIG. 1).

The relevant datastore may then store uploaded data and return or share a status of the operation (804) (e.g., success or failure) with the requestor. Marking of the transaction as complete may be used as a trigger to proceed with further policy determination/validation operations.

As data is exchanged between requestor and datastore, all the data may be copied and forwarded to the USC (806) by the kernel space component. If a quantity of exchanged data exceeds a cache of the user space component, some data may be persisted to disk as needed.

The USC may then determine transaction boundaries, and the USC separates transaction data from facilitation data (808). Transaction data may be split or partitioned into efficient block sizes (810) as desired (e.g., 4 kb/8 kb/16 kb).

Hashes may then be computed for each block (812) independently, as described with respect to FIG. 4. Resulting hashes may thus be used to compute a Merkle tree (814), for which a root node will include a hash value representing total data captured.

The Merkle tree may then be sent to the hash DB (816) by the user space component, such as the hash DB 340 of FIG. 3, where the Merkel tree is searched and compared in the hash DB (818) as requested. The hash DB 340 may, for example, search the computed Merkle tree against all hash values within the hash DB 340 to find a possible match. Matching may begin with leaf hashes and nodes and proceed to higher levels of the tree, as described with respect to FIG. 6. Based on detected levels of overlap relative to configured thresholds, one or more relevant roots may be returned to obtain associated access policies.

In more detail, such search and compare operations may include, e.g., traversing the structure of FIG. 5 in a breadth-first fashion and putting obtained hash values into a stack along with relevant level demarcations. An empty proceed set and an interim result set may be created.

While the thus-created stack is at least partially full, then for a current level being processed, a hash value from a previous set may be cleared from a proceed set if a parent node of the hash value is in the current level. Remaining hash values may be transferred, by level, from the proceed set in a previous level to an interim result set.

Operations may continue by level as a pop-stack operation, in which a top hash value is retrieved and removed, until the level is fully processed (for an initial set of pop values, all corresponding hash values may be put into a proceed set). A search of each popped hash value in the proceed set may be conducted, and discovered hash values may be checked to determine whether existing hash relationships fit the requested tree (e.g., has the same child(ren)). If so, each such discovered hash value may be placed into a proceed set for a next level to be checked.

Once a proceed set for a current level is empty, or once the stack is empty, then existing threshold(s) may be used to determine which of the examined levels should be processed from the interim result set. For example, a predetermined threshold may be a minimum number of levels that need to be matched, from bottom up of a compared Merkle tree in order to be considered similar. For qualifying hash values, corresponding roots in the hash DB 340 may be determined, and determined roots may be returned in order of highest qualified level to lowest qualified level.

Thus, as a result of the above or similar search and compare operations, the hash DB 340 may return zero, one, or more root nodes (820). If no root(s) are found (822), a request may be made for a database administrator (DBA) to create a new access policy (824). For example, a request for datastore administrator input for a new access policy may be made. A new policy may be received, for example, using the policy UI 344 of FIG. 3.

If a single root node is found (826), then the corresponding linked access policy may be applied to the data being stored as well (828). If there are two or more root nodes (826), then the most stringent or restrictive ones of the policy may be applied immediately (830), and user (e.g., administrator) input may be requested, e.g., by sending a notification to the user. The user may provide any suitable instructions, including, e.g., instructions for a possible override of the selected access policy in favor of another or an additional policy (832). Data source information for a top "n" matching roots may be considered, as well as unique access policies retrieved, when determining whether and/or how to apply access policies in these scenarios. In other implementations, rules or algorithms (including machine learning algorithms) may be constructed to determine access policies to apply when two or more root nodes are determined to correspond to data being uploaded.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatuses, e.g., a programmable processor, a computer, a server, multiple computers or servers, mainframe computer(s), or other kind(s) of digital computer(s). A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed by at least one computing device, are configured to cause the at least one computing device to:

grant an access request for accessed data, the accessed data governed by an access policy;

generate a hash tree for the accessed data;

store the hash tree in conjunction with the access policy;

receive a storage request for storing uploaded data;

generate a second hash tree of the uploaded data;

perform a comparison of the hash tree and the second hash tree; and relate the access policy to the uploaded data, based on the comparison.

2. The computer program product of claim 1, wherein the instructions, when executed, are further configured to cause the at least one computing device to:

intercept the access request;

duplicate the accessed data to obtain an accessed data copy; and generate the hash tree using the accessed data copy.

3. The computer program product of claim 2, wherein the instructions, when executed, are further configured to cause the at least one computing device to:

intercept the access request and duplicate the accessed data in conjunction with downloading the accessed data;

forward the accessed data copy to a user space; and generate the hash tree at the user space.

4. The computer program product of claim 3, wherein the instructions, when executed, are further configured to cause the at least one computing device to:

intercept and duplicate the access request at a kernel space; and forward the accessed data copy to the user space from the kernel space.

5. The computer program product of claim 2, wherein the instructions, when executed, are further configured to cause the at least one computing device to:

partition the accessed data copy into a plurality of partitions;

generate hash values from the plurality of partitions; and generate the hash tree using the hash values.

6. The computer program product of claim 1, wherein the instructions, when executed, are further configured to cause the at least one computing device to:

generate the hash tree as a binary hash tree.

7. The computer program product of claim 1, wherein the instructions, when executed, are further configured to cause the at least one computing device to:

generate the hash tree as a Merkle tree.

8. The computer program product of claim 1, wherein the instructions, when executed, are further configured to cause the at least one computing device to:

store the hash tree using a graph database; and link the access policy in a policy database to a root node of the hash tree in the graph database.

9. The computer program product of claim 1, wherein the instructions, when executed, are further configured to cause the at least one computing device to:

perform the comparison including determining whether a portion exceeding a threshold of the second hash tree matches a corresponding portion of the hash tree.

10. A computer-implemented method, the method comprising:

granting an access request for accessed data, the accessed data governed by an access policy;

generating a hash tree for the accessed data;

storing the hash tree in conjunction with the access policy;

receiving a storage request for storing uploaded data;

generating a second hash tree of the uploaded data;

performing a comparison of the hash tree and the second hash tree; and relating the access policy to the uploaded data, based on the comparison.

11. The method of claim 10, further comprising:

intercepting the access request;

duplicating the accessed data to obtain an accessed data copy; and generating the hash tree using the accessed data copy.

12. The method of claim 11, further comprising:

intercepting the access request and duplicating the accessed data in conjunction with downloading the accessed data;

forwarding the accessed data copy to a user space; and generating the hash tree at the user space.

13. The method of claim 11, further comprising:

partitioning the accessed data copy into a plurality of partitions;

generating hash values from the plurality of partitions; and generating the hash tree using the hash values.

14. The method of claim 10, further comprising:

storing the hash tree using a graph database; and linking the access policy in a policy database to a root node of the hash tree in the graph database.

15. The method of claim 10, further comprising:

performing the comparison including determining whether a portion exceeding a threshold of the second hash tree matches a corresponding portion of the hash tree.

16. A system comprising:

at least one memory including instructions; and at least one processor that is operably coupled to the at least one memory and that is arranged and configured to execute instructions that, when executed, cause the at least one processor to:

grant an access request for accessed data, the accessed data governed by an access policy;

generate a hash tree for the accessed data;

store the hash tree in conjunction with the access policy;

receive a storage request for storing uploaded data;

generate a second hash tree of the uploaded data;

perform a comparison of the hash tree and the second hash tree; and relate the access policy to the uploaded data, based on the comparison.

17. The system of claim 16, wherein the instructions, when executed, are further configured to cause the at least one processor to:

store the hash tree using a graph database; and link the access policy in a policy database to a root node of the hash tree in the graph database.

* * * * *